US007033156B2

(12) United States Patent

Gakovic

(10) Patent No.: US 7,033,156 B2
(45) Date of Patent: Apr. 25, 2006

(54) CERAMIC CENTER PIN FOR COMPACTION TOOLING AND METHOD FOR MAKING SAME

(76) Inventor: Luka Gakovic, 26 Cheshire Ridge, Victor, NY (US) 14564

( * ) Notice: Subject to any disclaimer, the term of this patent is extended or adjusted under 35 U.S.C. 154(b) by 0 days.

(21) Appl. No.: 10/320,331

(22) Filed: Dec. 16, 2002

(65) Prior Publication Data

US 2003/0194463 A1 Oct. 16, 2003

Related U.S. Application Data

(60) Provisional application No. 60/371,816, filed on Apr. 11, 2002.

(51) Int. Cl.
*B29C 43/02* (2006.01)

(52) U.S. Cl. ........................ 425/78; 425/352; 425/444; 425/469

(58) Field of Classification Search .................. 425/78, 425/352, 444, 469, DIG. 58; 249/67
See application file for complete search history.

(56) References Cited

U.S. PATENT DOCUMENTS 2,360,528 A * 10/1944 Talmage .............. 425/DIG. 58
3,524,220 A * 8/1970 Davison ....................... 425/78
3,664,784 A * 5/1972 Sibley ......................... 428/78
4,347,051 A * 8/1982 DeSantis ..................... 425/78
4,380,473 A * 4/1983 Lichtinghagen ............. 425/408
4,443,171 A 4/1984 Dixon ......................... 425/78
4,690,791 A 9/1987 Edmiston .................... 264/122
4,719,074 A * 1/1988 Tsuno et al. .................... 419/5
5,036,581 A 8/1991 Ribordy et al. .......... 425/126.1
5,122,319 A 6/1992 Watanabe et al. ........... 264/109
5,294,382 A * 3/1994 Goldberger ................. 264/450
5,365,661 A * 11/1994 Mizuno et al. .......... 29/889.21
5,507,896 A 4/1996 Yoshimura et al. ........... 156/89
5,628,047 A * 5/1997 Hiroyoshi .................... 419/62
5,725,816 A 3/1998 Sagawa et al. ............. 264/102
5,770,136 A 6/1998 Huang ........................ 264/101
5,851,568 A 12/1998 Huang ........................ 425/356
5,930,581 A 7/1999 Born et al. ..................... 419/5
5,994,250 A 11/1999 Suzuki et al. ............... 264/104

FOREIGN PATENT DOCUMENTS

EP 1075885 A3 8/2000
JP 61-041515 * 2/1986
JP 61-058707 * 3/1986

(Continued)

OTHER PUBLICATIONS

MarkeTech International, Inc., 4750 Magnnolia St., Port Twonsend WA 98368; www.mkt-intl.com/ceramics/brazephotos.htm.; Mar. 4, 2002 C. 1996-2002.

(Continued)

*Primary Examiner*—Duane Smith
*Assistant Examiner*—Thu Khanh T. Nguyen
(74) *Attorney, Agent, or Firm*—Basch & Nickerson LLP; Duane C. Basch

(57) ABSTRACT

The present invention is a method and apparatus for the production of compacted powder elements. More specifically, the present invention is directed to the improvement of tooling for powder compaction equipment, and the processes for making such tooling. The improvement comprises the use of a ceramic tip or similar component in high wear areas of the tooling, particularly center pins. Moreover, the use of such ceramic components enables reworking and replacement of the worn tool components.

26 Claims, 9 Drawing Sheets

FOREIGN PATENT DOCUMENTS

| | | |
|---|---|---|
| JP | 63126682 | 5/1988 |
| JP | 02151398 | 6/1990 |
| JP | 07003303 | 1/1995 |
| JP | 10061765 | 3/1998 |

OTHER PUBLICATIONS

Ceramic Laser Bores; www.stratamet.com/page3.html; Oct. 5, 2001; Brazing of metal/ceramic bore assemblies.

EverWear Ceramic Plungers Checkpoint EverWear, date unknown.

Coors Tek Oklahoma Operations; 450 24th Ave. NW, Norman Ok 73069; Plungers/Valves/Centrifugal/Packing; date unknown.

Maret SA, Rue de Croix 43, CH-2014 Bole, Switzerland; info@maret.ch; Advanced ceramics, ruby and sapphire; pitons; rotary valves, date unknown.

Fluid Metering, Inc., 5 Aerial Way, Suite 500, Syosset, NY 11791; 1-800-223-3388; CeramPump Principal of Operation; ceramic piston, date unknown.

Sapphire Engineering, Inc., 53 Portside Drive\, Pocasset, MA 02559; 508-563-5531; ceramic pistons, date unknown.

Maret SA, Rue de Croix 43, CH-2014 Bole, Switzerland; ceramic components; advanced ceramic, ruby, and sappire components are supplied for use in pistons, check valves, and rotors and stators. Reader Service #, date unknown.

National Oilwell; p;ungers and piston pumps. plungers utilize materials such as high quality ceramics; ceramic plungers; Fluid King; date unknown.

Ceramics Industrial Ceramics Division; ceramic plungers for piston pump; CUMI, date unknown.

CTS; 1-800-670-4667; c. 1998-2003 Chromatograpy Technology Service Corp.; Sapphire or ceramic plungers for HPLC pumps.

* cited by examiner

CERAMIC CENTER PIN FOR COMPACTION TOOLING AND METHOD FOR MAKING SAME

Cross-reference is made to and priority is claimed from, the following related application, which is hereby incorporated by reference for its teachings: "CERAMIC CENTER PIN FOR COMPACTION TOOLING AND METHOD FOR MAKING SAME." Luka Gakovic. U.S. Provisional Application No. 60/371,816, filed Apr. 11, 2002.

This invention relates generally to compaction tooling components, and more particularly to a compaction tool, such as a center pin, incorporating a tip or wear surface comprising a ceramic component and the method for manufacturing and assembling such a center pin.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY OF THE INVENTION

The present invention is directed to improvements in the tooling used in compaction equipment and tableting machines, and particularly the tooling used in the equipment utilized in making components of dry-cell batteries, e.g., various sizes of 1.5 volt (AAA, AA, C, D) and 9 volt batteries used in consumer electronic devices. It will be further appreciated that various aspects of the invention described herein may be suitable for use with well-known compaction tooling and tableting equipment, and particularly to center pins and punches employed in the manufacture of oral pharmaceuticals, etc.

Heretofore, a number of patents have disclosed processes and apparatus for the forming of parts by the compression of unstructured powders, sometimes followed by heat-treating of the compressed part. The relevant portions of these patents may be briefly summarized as follows; and are hereby incorporated by reference for their teachings:

U.S. Pat. No. 5,036,581 of Ribordy et al, issued Aug. 6, 1991, discloses an apparatus and method for fabricating a consolidated assembly of cathode material in a dry cell battery casing.

U.S. Pat. No. 5,122,319 of Watanabe et al, issued Jun. 16, 1992, discloses a method of forming a thin-walled elongated cylindrical compact for a magnet.

U.S. Pat. No. 4,690,791 of Edmiston, issued Sep. 1, 1987, discloses a process for forming ceramic parts in which a die cavity is filled with a powder material, the powder is consolidated with acoustic energy, and the powder is further compressed with a mechanical punch and die assembly.

U.S. Pat. No. 5,930,581 of Born et al, issued Jul. 27, 1999, discloses a process for preparing complex-shaped articles, comprising forming a first ceramic-metal part, forming a second part of another shape and material, and joining the two parts together.

Referring to FIG. 1, there is illustrated a prior art compaction tool as might be employed for the production of a cylindrically shaped battery component. In use of such a tool in battery manufacturing, the die 20 receives a lower punch

22 that is inserted into the die. The lower punch includes a through-hole in the center thereof that allows a center pin 24 to be inserted therein. The punch and center pin then, in conjunction with the die, form a cavity into which a powder mix employed in battery manufacture can be deposited. Such a powder mix may include wetting agents, lubricating agents, and other proprietary solvents added just before filing the die cavity. Once filled, the cavity is then closed by an upper punch 26 that is inserted into the upper end of the die and the punches are directed toward one another so as to compact the powder material 28 therein. In typical systems, the compaction force is applied by mechanical and/or hydraulic systems so as to compress the powder material and produce a compacted part (e.g., a tablet or a cylindrical component), examples of which are described in the patents incorporated by reference above.

During the compaction process, however, the application of significant compressive forces results in a high friction level applied to the interior of the die surface in region 30 and to the exterior of the center pin tip in region 31. This friction force causes a high level of wear on the compaction tooling, resulting in the frequent need to change out and rework such tooling. Although it is known to employ ceramics in the interior region of the die, to reduce the wear from friction, ceramics have not been successfully employed on the center pin tip because of the difficulty in reliably affixing the ceramic to the center pin. Although a ceramic coating may be provided on a center pin tip by known methods, e.g. arc plasma spray coating, such coatings have not been found to be satisfactory.

Thus, it is often the case that the dies considerably outlast the center pins and that frequent replacement and rework of center pins continues to be a problem that plagues the powder compaction industry. One prior art method and apparatus for the manufacturing of cylindrical dry cell batteries, which entails the compression of powdered material is described in U.S. Pat. No. 5,036,581 of Ribordy et al, previously incorporated by reference.

The present invention is, therefore, directed to both an apparatus that successfully employs a ceramic component on the wear surfaces of a compaction tooling center pin or core rod, as well as the methods of making and repairing the same. In particular, the invention relies on various alternative embodiments for connecting a ceramic component to the end of a metal center pin base; the selection of the particular embodiment may be dependent upon the use characteristics for the apparatus.

In accordance with an aspect of the present invention, there is provided an apparatus for forming a powder material into a solid form through the application of pressure, comprising: a die; a lower compression punch insertable into a lower end of said die, said lower compression punch having a ceramic-tipped center pin passing therethrough where the ceramic reduces the wear of said outer surface of said center pin; means for filling at least a portion of the cavity defined by said die, said lower compression punch, and said center pin with the powder material; and an upper compression punch, insertable into an upper end of said die to compact the powder material.

In accordance with another aspect of the present invention, there is provided a method of manufacturing a compression center pin for use in a punch and die powder compaction apparatus, comprising the steps of: forming a center pin base of a rigid material (e.g., tool steel or pre-hardened steel); forming a center pin tip of a ceramic material (e.g., zirconia); and affixing the center pin tip to the center pin base.

In accordance with yet another aspect of the present invention, there is provided a method of repairing a compression center pin for use in a punch and die powder compaction apparatus, comprising the steps of: removing a center pin tip from a center pin base; reworking or replacing the center pin tip with a ceramic material (e.g., zirconia); and affixing the center pin tip to the center pin base.

One aspect of the invention is based on the discovery of techniques for connecting or semi-permanently affixing a ceramic tip for a center pin to the center pin base in a manner that will survive the high pressure and friction of the compaction apparatus. The techniques described herein not only allow for the successful attachment of ceramic tips, but also allow for the reworking and replacement thereof, so that only damaged or worn components are replaced, and not the entire center pin. It will be appreciated that solid ceramic center pins may be produced, however, they are believed to be cost prohibitive and difficult to repair and rework.

The techniques described herein are advantageous because they can be adapted to any of a number of compaction tooling applications. In addition, they can be used in other similar compaction embodiments to allow for the use of ceramic materials in high-friction environments where tool steels and other surface hardening processes fail to provide sufficient improvement in tool life. The techniques of the invention are advantageous because they provide a range of alternatives, each of which is useful in appropriate situations. As a result of the invention, the life of compaction center pins and other tooling may be significantly increased and the cost of reworking the same may be reduced.

Figure 1:
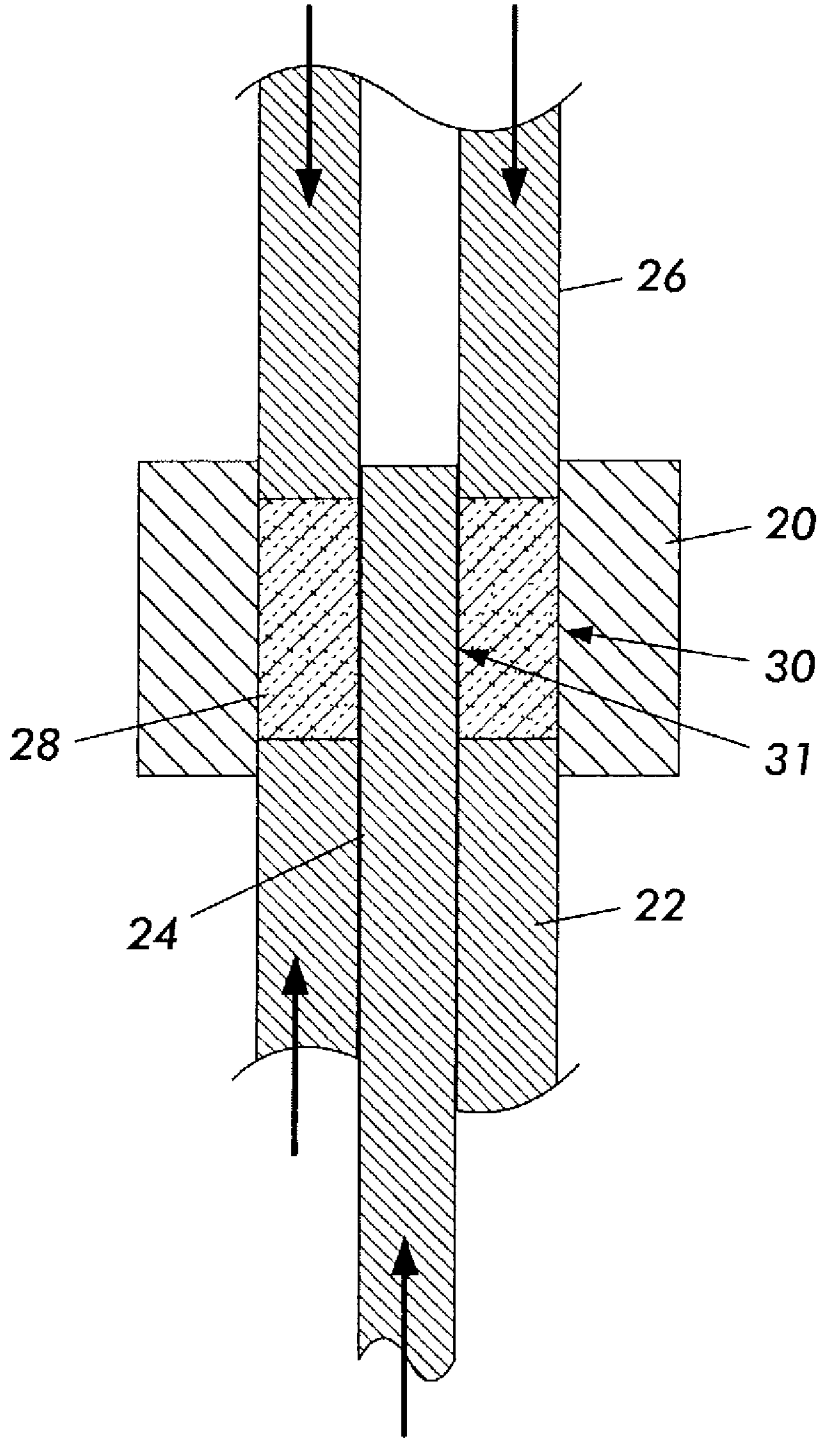
FIG. 1 PRIOR ART
FIG. 1 is a cross-sectional view of a prior art compaction tooling die, punch and center pin set for compaction of a powder material for use in a dry cell battery.

The present invention will be described in connection with a preferred embodiment, however, it will be understood that there is no intent to limit the invention to the embodiments described. On the contrary, the intent is to cover all alternatives, modifications, and equivalents as may be included within the spirit and scope of the invention as defined by the appended claims.

DESCRIPTION OF THE PREFERRED EMBODIMENTS

For a general understanding of the present invention, reference is made to the drawings. In the drawings, like reference numerals have been used throughout to designate identical elements.

Reference may also be had to Table 1, "Glossary Of Ceramic Terms", and Table 2, "General Descriptions of Structural Ceramic Materials", both Innex Industries, Inc. internal publications. Tables 1 and 2 are incorporated herein for their teachings of terms and properties related to ceramic materials used in the present invention.

TABLE 1

GLOSSARY OF CERAMIC TERMS: ZIRCONIA WEAR PARTS

| TERM | DEFINITION |
|---|---|
| Density (metric units: g/cm$^3$, Kg/m$^3$) | Mass per unit volume of a substance |
| Strength Flexural strength Modulus of Rupture, MOR 3 or 4-point-bend strength (metric units: MPa, GPa) | The stress (force per area) required to rupture, crack, fracture, break the material High strength needed for impact and thermal shock Flaws cause fracture in ceramics and must be controlled by careful processing |
| Toughness Fracture Toughness Critical Stress Intensity Factor $K_{1c}$ (metric units: MPa-m$^{1/2}$) | Toughness is described as the load per unit area required in initate a crack when load is applied to a surface. Ceramics and glass are stronger than metals, but less tough and fail by fracture (cracking). High toughness stops cracking Toughness improves strength, impact resistance Low toughness can lead to wear and fracture |
| Hardness | Hardness is the resistance of a material to compression, deformation, denting, scratching, and indentation. Hardness is a useful relative measure rather than a material property, and is usually measured by indentation. Hardness important for wear resistance, but higher hardness leads to lower toughness Hardness greatly affected by ceramic processing |
| Vickers Hardness, $H_v$ Vickers Hardness Number, VHN (metric units: GPa, Kg/mm$^2$) | The Vickers Hardness test is used for ceramics. It is similar to the Brinell Hardness test, using an indentor in the form of a square-based diamond pyramid. The result is expressed as the load divided by the area of the impression. |
| Wear-resistance | Wear-resistance is generally defined as the progressive removal of material from the surface under operational conditions. High hardness, toughness, strength are best for wear-resistance, but harder materials can lack toughness Correct material must be selected for the application |
| Zirconia Zirconium oxide Zirconium dioxide $ZrO_2$ Partially stabilized zirconia, PSZ Tetragonal zirconia polycrystal, TZP | Zirconia in the partially stabilized phase is a tough, white ceramic with fairly good hardness. Alumina can be added to zirconia to increase the hardness. Zirconia's excellent wear resistant properties depend on a phase change (martensitic transformation) that limits the high temperature use. Fully stabilized zirconia is used in fuel cells, oxygen sensors, and jewelry. |
| Alumina Aluminum oxide Corundum $Al_2O_3$ | Aluminum oxide is a very hard white ceramic that is stable at elevated temperatures but has fairly low toughness. Alumina is excellent in sliding wear, if there is no impact. Zirconia can be added to alumina to increase the toughness. |
| Stabilizers Additives Stabilizing, | Stabilizers are added to zirconia to produce the toughening effect. The stabilizers are oxide additives that change the zirconia to the toughened (partially |

TABLE 1-continued

GLOSSARY OF CERAMIC TERMS: ZIRCONIA WEAR PARTS

| TERM | DEFINITION |
| --- | --- |
| stabilization<br>Partially stabilized | stabilized) phase. These included yttria ($Y_2O_3$), magnesia (MgO), calcia (CaO), and ceria ($CeO_2$). The additives also affect the hardness of the zirconia. |

TABLE 2

GENERAL DESCRIPTIONS OF STRUCTURAL CERAMIC MATERIALS

| MATERIAL | PROCESSING | COMMON APPLICATIONS | RELATIVE COST |
| --- | --- | --- | --- |
| Oxides | | | |
| Alumina $Al_2O_3$ | Pressureless sintering (1550–1700 C.) Hot Isostatic Pressing (HIPing) | Wide range of applications including: Electronic substrates, spark plug insulators, transparent envelopes for lighting, structural refractories, wear resistant components, ceramic-to-metal seals, cutting tools, abrasives. Thermal insulation, catalyst carriers, biomedical implants | 1 |
| Zirconia ($ZrO_2$) | Pressureless sintering (1500 C.) | Wear resistant components, cutting tools, engine components, thermal coatings, thermal insulation, biomedical implants, fuel cell | 3 |
| Zirconia Toughened Alumina ZTA | Pressureless sintering (1500–1600 C.) | Wear resistant components | 3 |
| Alumina Toughened Zirconia ATZ | Pressureless sintering (1500–1600 C.) | Wear resistant components | 3 |
| Nonoxides | | | |
| Silicon Carbide (SiC) | Pressureless sintering Hot Pressing, HIPing | Refractories, abrasives, mechanical seals, pump bearings | 5 |
| Silicon Nitride ($Si_3N_4$) | Pressureless sintering Hot Pressing, HIPing Reaction bonding. | Molten-metal-contacting parts, wear surfaces, Special electrical insulators, metal forming dies, Gas turbine components | 6 |
| Boron Carbide ($B_4C$) | Hot Pressing (2100–2200 C.), Pressureless Sintering, HIPing | Fine polishing, abrasive resistant parts | 10 |
| Titanium diboride ($TiB_2$) | Pressureless sintering Hot Pressing, HIPing | Light weight ceramic armor, nozzles, seals, wear parts, cutting tools | 9 |
| Tungsten Carbide (WC) | Pressureless sintering Hot Pressing, HIPing | Abrasives, cutting tools | 3 |

Relative cost is on a scale of 1 (low) to 10 (high) for dense material suitable for structural applications.
Note that gaps in the scale are indicative of large differences in cost.

Figure 2:
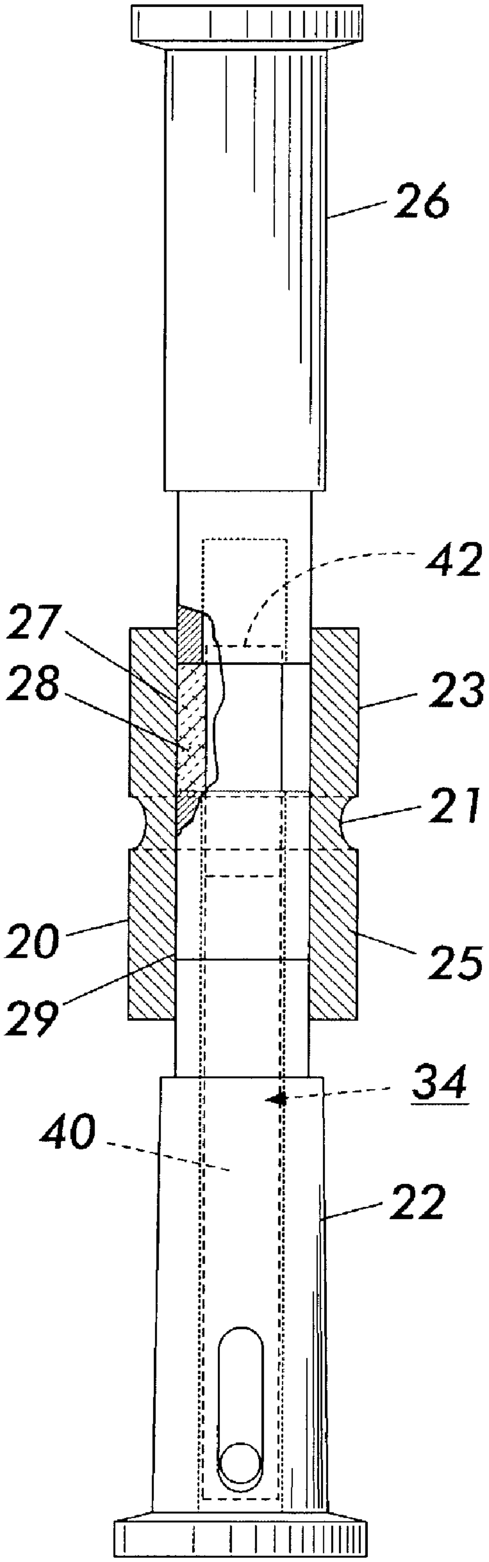
FIG. 2 is a cross-sectional view of the various components of FIG. 1, including an aspect of the present invention.

Having described the basic operation of the compaction apparatus with respect to FIG. 1, attention is now turned to the particular components of the present invention as illustrated in FIG. 2. FIG. 2 is a cross-sectional view of the components similar to FIG. 1, wherein the center pin assembly 34, in accordance with the present invention, is comprised of a center pin base 40 and a center pin tip 42. In the preferred embodiment, center pin tip 42 is preferably comprised of a structural ceramic material such as wear resistant ceramic oxides.

One such group of suitable wear resistant ceramic oxides is zirconia, which includes the species zirconium oxide, zirconium dioxide, tetragonal zirconia polycrystal (TZP), and partially stabilized zirconia (PSZ). Such partially stabilized zirconia may comprise stabilizers, e.g. yttria ($Y_2O_3$), magnesia (MgO), calcia (CaO), and ceria ($CeO_2$). A second group of suitable wear resistant ceramic oxides is alumina, also known as aluminum oxide ($Al_2O_3$) and corundum. A third group of suitable wear resistant ceramic oxides comprises mixtures of zirconia and alumina, including zirconia toughened alumina (ZTA), comprising between about 5 weight percent $Zr_2O_3$ and about 40 weight percent $Zr_2O_3$. Further examples of suitable wear resistant ceramic oxides are found in Table 3, along with their relevant physical properties.

TABLE 3

PROPERTIES OF WEAR RESISTANT CERAMIC OXIDES.

NOTE: The wide range in properties is a result of the many different processing methods and raw materials. Typical values are found in the mid range. The best materials are found through head to head property analysis that can differ significantly from ceramic supplier data sheets.

| MATERIAL | DENSITY ($g/cm^3$) | STRENGTH (MPa) | HARDNESS (GPa) | TOUGHNESS ($MPa\text{-}m^{1/2}$) |
|---|---|---|---|---|
| Zirconia | 5.9–6.2 | 400–1400 | 8–14 | 5–15 |
| *Y-TZP | 6.0 | 800–1400 | 13–14 | 5–8 |
| **Y-PSZ | 6.0 | 800–1400 | 12–13 | 5–8 |
| +Ce-TZP | 6.1–6.2 | 1000–1300 | 11–13 | 10–15 |
| ×Mg-PSZ | 5.9–6.0 | 400–1100 | 9–13 | 6–11 |
| #Ca-PSZ | 5.9–6.0 | 400–800 | 9–11 | 5–9 |
| ++Ce-PSZ | 6.1–6.2 | 400–800 | 7–9 | 6–15 |
| ZTA zirconia toughened alumina | 4.1–5.0 | 300–1600 | 12–19 | 3–8 |
| 5% $ZrO_2$ | 4.1–4.2 | 300–500 | 15–19 | 3–5 |
| 20% $ZrO_2$ | 4.4–4.5 | 500–1000 | 14–17 | 3–6 |
| 40% $ZrO_2$ | 4.8–5.0 | 500–1600 | 12–16 | 4–8 |
| AZ alumina strengthened zirconia | 5.4–5.6 | 800–2000 | 10–15 | 5–10 |
| 80% $ZrO_2$ | 5.4–5.6 | 800-2000 | 10–15 | 5–10 |
| Alumina | 3.8–4.0 | 250–600 | 15–21 | 3–4 |
| 99% alumina | 3.80 | 250–350 | 15–17 | 3–4 |
| 99.5% alumina | 3.8 | 300–400 | 17–19 | 3–4 |
| 99.9% alumina | 3.9–4.0 | 350–500 | 17–20 | 3–4 |
| 99.95% alumina | 3.9–4.0 | 350–600 | 18–21 | 3–4 |

Note:
The "stabilizing" additive is a minor addition to the zirconia, but has a significant effect on the hardness and toughness. In general, the higher toughness zirconias have lower hardness.
*Y-TZP (also called TZP) = Yttria stabilized Tetragonal Zirconia Polycrystal (special case of hard Y-PSZ)
**Y-PSZ = Yttria Partially Stabilized Zirconia
+Ce-TZP = Ceria stabilized Tetragonal Zirconia Polycrystal (new material-special case of tough Ce-PSZ)
×Mg-PSZ = Magnesia Partially Stabilized Zirconia
#Ca-PSZ = Calcia Partially Stabilized Zirconia (not usually used in wear parts)
++Ce-PSZ = Ceria Partially Stabilized Zirconia In one embodiment, center pin tip 42 was fabricated by machining a ceramic tube of zirconia supplied by the CoorsTeck Corporation. Such a tube was supplied in near net shape form, oversized by 0.030 on the outside diameter and undersized by 0.030 inch on the inside diameter. The tube was finished to a 0.250 inch inside diameter and a 1.250 inch outside diameter, using a cylindrical grinding machine tool.

In addition to ceramics, other materials are also suitable for the fabrication of a center pin tip, and to be considered within the scope of the present invention. For example, one may use a tip comprised of e.g., silicon carbide, tungsten carbide, titanium nitride, or carborundum. In one further embodiment, a tip comprising a pre-hardened steel sleeve having a diamond impregnated surface may be used.

Figures 3A, 3B, 3C, 3D:
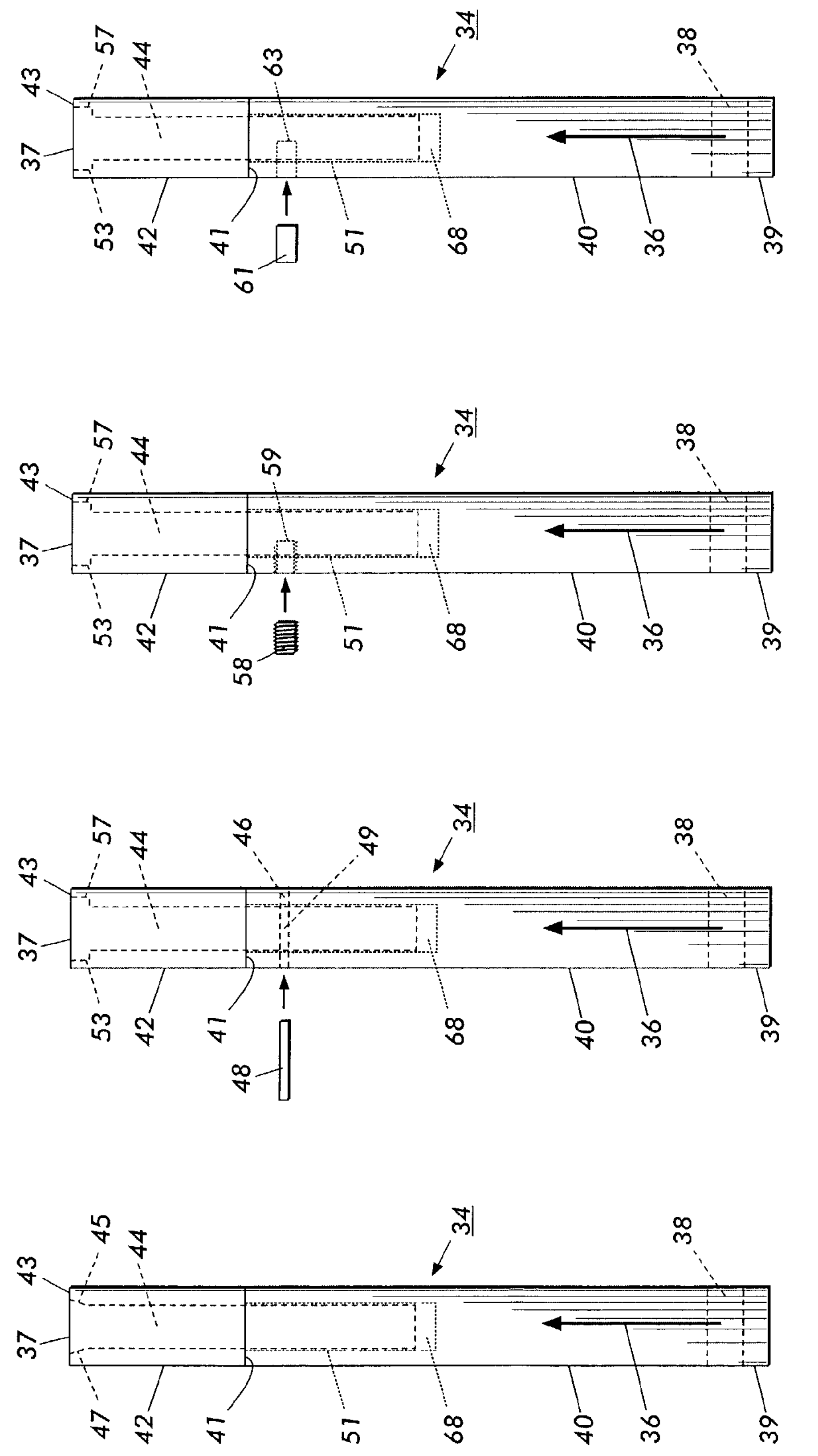
FIGS. 3A, 3B, 3C, and 3D are cross-sectional views of the components and assemblies of embodiments of the present invention.
Figure 4A:
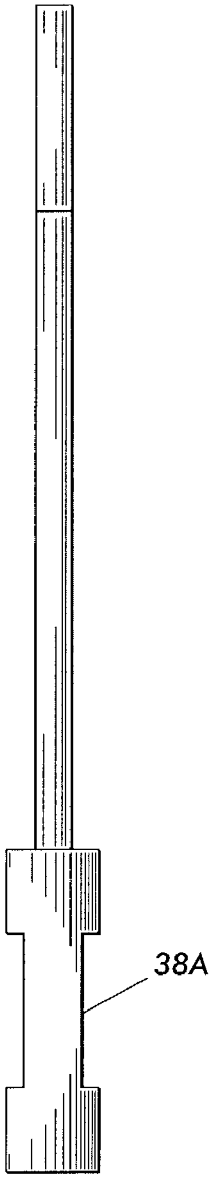
FIGS. 4A, 4B, and 4C are side elevation views of alternative center pin designs, for the purpose of illustrating, without limitation, three alternative configurations of attaching the center pin base to the associated tableting or compaction equipment.
Figure 4B:
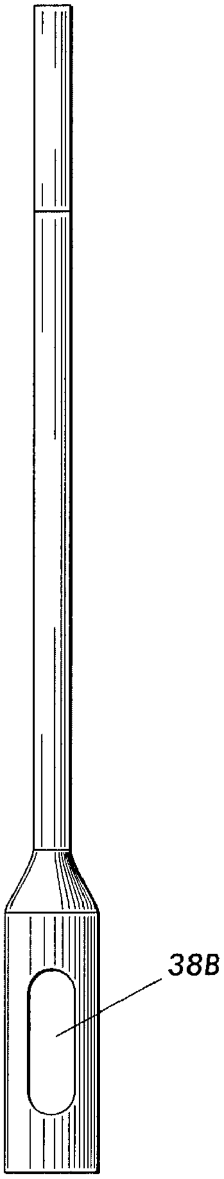
Figure 4C:
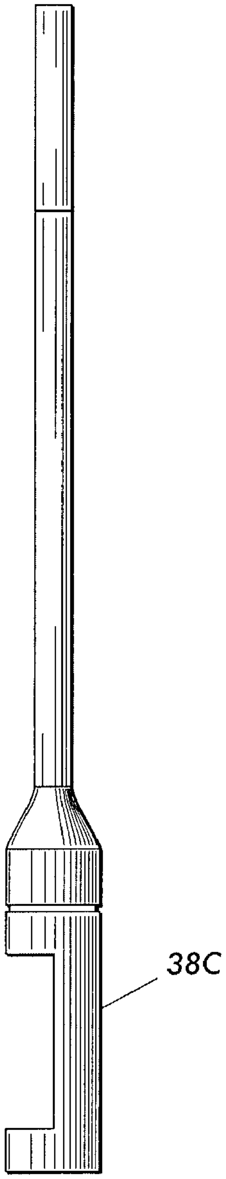

Referring to FIG. 3A, the center pin assembly 34 includes at least three components. A first component is a center pin base 40, which is a generally cylindrical component having an aperture 38 in the lower end 39 thereof for controlling the position of the center pin with a shaft of the compaction apparatus (not shown) inserted into the aperture 38. It will be noted that the present invention contemplates use in any number of compaction tooling machines and that aperture 38 may be replaced by any center pin attachment design, for example, those depicted in FIGS. 4A, 4B, and 4C. In a first embodiment depicted in FIG. 4A, aperture 38 is replaced by center beam 38A. In a second embodiment depicted in FIG. 4B, aperture 38 is replaced by slot 38B. In a third embodiment depicted in FIG. 4C, aperture 38 is replaced by offset beam 38C.

It will be apparent that corresponding mating tools are provided in the drive mechanism (not shown) to properly engage each of these three embodiments and apply an upward axial force thereupon. It will be further apparent that many other suitable configurations of center pin assembly 34 may be used, with the operative requirement being that center pin assembly 34 comprises a surface that is engageable with a mating tool to apply a force along the axis of center pin assembly 34, as indicated by arrow 36 of FIGS. 3A–3D.

At the upper end 41 of the center pin base 40, in the embodiment of FIGS. 3A–3D, is a cylindrical hole 68 that extends into the center pin base 40 for approximately 1.50 inches. Hole 68 may have a depth in the range of 0.500 inches to 2.000 inches. The center pin base is preferably made from tool steel or pre-hardened steel, although various metals and possibly other materials may be employed. The compositions and properties of suitable tools steels and pre-hardened steels are provided on pp. 2069–2095 of *Machinery's Handbook*, 22*nd Ed*., the disclosure of which is incorporated herein by reference.

Referring again to FIGS. 3A–3D, a second component of center pin assembly 34 is a ceramic tip 42 that forms the wear surface of the center pin assembly 34. Ceramic tip 42 is attached to center pin base 40 using a third component, mandrel arbor 44, preferably made from tool steel or pre-hardened steel. As illustrated, mandrel arbor 44 is generally cylindrical, but includes either a tapered head at an upper end 37 thereof mated with tapered hole in ceramic tip 42, or a square head mated with counterbored hole in ceramic tip 42, so as to provide a positive engagement between mandrel arbor 44 and the ceramic tip 42.

In one embodiment depicted in FIG. 3A, ceramic tip 42 comprises a tapered hole 47, and mandrel arbor 44 comprises a matching tapered head 45, which is congruent with tapered hole 47 of ceramic tip 42, when center pin assembly 34 is fully assembled. In a more preferred embodiment depicted in FIGS. 3B–3D, ceramic tip 42 comprises a counterbored hole 53 having a shoulder, and mandrel arbor 44 comprises a matching square head 57, which is congruent with counterbored hole 53 of ceramic tip 42, when center pin assembly 34 is fully assembled.

To affix ceramic tip 42 to base 40, the components 40 and 42 may be fastened together by a number of joining methods known in the art, such as the methods disclosed in "Mechanical and Industrial Ceramics" published in 2002 by the Kyocera Industrial Ceramics Corporation of Vancouver, Wash. As recited at page 19 of such publication, "Joining Ceramics to Other Materials" bonding methods include screwing, shrink fitting, resin molding, metal casting, organic adhesives, inorganic adhesives, inorganic material glazing, metallizing, and direct brazing. Soldering may also be a suitable joining method.

In the preferred embodiment depicted in FIG. 3A, one end 51 of mandrel arbor 44 is provided with an outside diameter sufficient to provide joining by gluing or by an interference fit with the inside diameter of the hollow or hole 68 in the center pin base 40. Such an interference fit is preferably achieved by performing a shrinkage fit, wherein base 40 is heated, and expands sufficiently to slide over mandrel arbor 44. A description of allowances and tolerances for fits between two parts may be found in *Machinery's Handbook*, 22nd *Ed*. pp. 1517–1566, the disclosure of which is incorporated herein by reference. In particular, the assembly of parts by a shrinkage fit is described on pp. 1520–1524.

To assemble the center pin assembly 34 by use of a shrinkage fit, two operations are required. In the first operation, mandrel arbor 44 is fitted within ceramic tip 42. Mandrel arbor 44 may be a slip fit within ceramic tip 42. In one embodiment, mandrel arbor 44 is an interference fit within ceramic tip 42. In such an embodiment, either mandrel arbor 44 is cooled, or ceramic tip 42 is heated, or both, and mandrel arbor 44 is inserted through and engaged with ceramic tip 42, as shown in FIG. 3A. Assembled ceramic tip 42 and mandrel arbor 44 are allowed to thermally equilibrate with each other and reach approximately room temperature, whereupon such parts are firmly joined with an interference fit.

In another embodiment of an interference fit between mandrel arbor 44 and ceramic tip 42, both mandrel arbor 44 and ceramic tip 42 are maintained at room temperature, and mandrel arbor 44 is "press fit" through ceramic tip 42 using a pressing machine. In another embodiment, mandrel arbor 44 and ceramic tip 42 are joined together using an adhesive. Suitable adhesives are described elsewhere in this specification. Alternatively, mandrel arbor 44 and ceramic tip 42 are joined together by brazing.

Subsequent to the formation of an arbor and tip subassembly, the subassembly is joined to base 40. In one embodiment, base 40 is heated preferably by induction heating means, to expand the diameter of hole 68 therein. The lower end 51 of mandrel arbor 44 extending beyond tip 42 is then press fit into the heat-expanded hole 68. Once assembled, the assembly 34 may be air cooled or quenched in a synthetic oil or similar liquid to cool the base and to prevent damage to the ceramic from uneven heating.

In one embodiment, mandrel arbor 44 was fabricated of Histar 40 pre-hardened steel with a diameter of 0.252 inch at its end 51. Base 40 was fabricated of Histar 40 pre-hardened steel with an outside diameter of 0.50 inch, and a hole 68 therein of 1.50 inches in length and 0.250 inch in diameter. Base 40 was heated to a temperature of between 600° and 1000° Fahrenheit using induction heater Model No. 301-0114H of the Ameritherm Corporation, Inc. of Scottsville, N.Y. End 51 of mandrel arbor 44 was then immediately slidably inserted into heat-expanded hole 68 of base 40 to a depth wherein the ends of ceramic tip 42 and base 40 were in contact with each other. The resulting assembled center pin assembly 34 was then air cooled to approximately 100° Fahrenheit.

In an alternative embodiment, instead of or in addition to an interference fit, mandrel arbor 44 may be attached to the base 40. In a manner similar to that described above, and referring to FIG. 3B, mandrel arbor 44 is inserted through the tip 42, and into hole 68 in base 40. Once assembled, a retainer pin 48 is inserted through coaxially aligned hole 46 in base 40 and hole 49 in mandrel arbor 44 as illustrated in FIG. 3B. In one embodiment, it is contemplated that the holes 46 in base 40 and hole 49 in mandrel arbor 44 are not drilled until the components are assembled and mandrel arbor 44 and tip 42 are held in a compressive relationship, thereby assuring a "tight" attachment of the tip 42 to the base 40. In one embodiment, retainer pin 48 comprises pre-hardened steel of the same composition as mandrel arbor 44 of FIG. 3B.

FIGS. 3C and 3D depicts alternate embodiments of means for securing mandrel arbor 44 to base 40. Referring to FIG. 3C, in one embodiment, center pin assembly 34 further comprises a setscrew 58, which is threadedly engaged with tapped hole 59. Tapped hole 59 and the threads therein are formed through both center pin base 40 and mandrel arbor 44. Thus, it is preferable that in the process of assembly of center pin base 40 and mandrel arbor 44, mandrel arbor 44 is pressed into center pin base 40, and tapped hole 59 is formed by drilling and tapping while mandrel arbor 44 and center pin base 40 are forcibly held together, followed by the screwing of setscrew 58 into hole 59, until setscrew 58 has been forced into the bottom of hole 59.

In one embodiment, setscrew 58 is bonded into tapped hole 59 by a thread locking sealant such as e.g. a cyanoacrylate adhesive. In another embodiment, setscrew 58 is a self locking setscrew, provided with a plastic (e.g. nylon) insert along its threaded length, which is deformed when setscrew 58 is engaged with tapped hole 59. Such self-locking setscrews are well known in the art. In another embodiment, setscrew 58 is a self locking setscrew, having a coating of microencapsulated beads of reactive resin and hardener, such that when setscrew 58 is threadedly engaged with tapped hole 59, the shearing action of threads of setscrew 58 with threads of tapped hole 59 rupture and mix the contents of the microencapsulated beads, thereby making an adhesive composition (e.g. an epoxy), which locks setscrew 58 into tapped hole 59. Such reactive adhesive coatings for the securing of threaded fasteners are well known in the art.

Referring to FIG. 3D, and in further embodiments, a plug 61 of material is engaged with hole 63 to effect the fastening of mandrel arbor 44 to base 40. As was described for the uses of a setscrew fastener, it is preferable that mandrel arbor 44 is pressed into center pin base 40, and hole 59 is formed by drilling through base 40 into mandrel arbor 44 while mandrel arbor 44 and center pin base 40 are forcibly held together, followed by the engagement of plug 61 of material with hole 63. The manner in which plug 61 of material is engaged with hole 63 depends upon the material composition of plug 61.

In one embodiment, plug 61 is a dowel pin, preferably made of a pre-hardened steel of the same composition as mandrel arbor 44 of FIG. 3B. In such circumstances, plug 61 is dimensioned to have an interference fit in hole 63, and plug 61 is forcibly pressed into hole 63. In a similar embodiment, hole 63 is formed in a rectangular shape, and plug 61 is formed from a matching piece of rectangular key stock, and pressed into hole 63.

In other embodiments, plug 61 is engaged with hole 63 by a phase change and/or an alloying operation. Plug 61 may be of the same composition as mandrel arbor 44 and base 40, so that plug 61 may be welded into hole 63. Alternatively, plug 61 may be brazed into hole 63. Plug 61 may comprise a plug of solder, such that plug 61 is heated and melted, and flows into hole 63, whereupon plug 61 cools and solidifies therein.

Alternatively or additionally, adhesives may be used to join mandrel arbor 44 and base 40. Such adhesives may be applied to the wall surface of hole 68 of base 40, or the end 51 of mandrel arbor 44 and/or the tapered surface 45 of mandrel arbor 44 (see FIG. 3A), or the stepped surface 57 of mandrel arbor 44 (see FIGS. 3B–3D), followed by inserting of mandrel arbor 44 into base 40.

Suitable adhesives for such assembly may be e.g. cyanoacrylates, epoxies, and the like, and such adhesives may also include metal and/or ceramic fillers to match properties such as thermal expansion coefficient with those of mandrel arbor 44 and base 40. One suitable product line of adhesives is manufactured by the Cotronics Corporation of Brooklyn, N.Y. In one embodiment, Cotronics Duralco 4535 Vibration Proof Structural Adhesive was used to join mandrel arbor 44 to base 40. Other suitable adhesives manufactured by Cotronics are Resbond S5H13 epoxy, Duralco 4540 Liquid Aluminum Epoxy, and Duralco 4703 Adhesive and Tooling Compound. Such adhesives are described in Cotronics Corporation sales bulletin Volume 01 Number 41, "High Temperature Materials and Adhesives for Use to 3000° F.". Other suitable adhesives used in ceramic-ceramic and ceramic-metal bonding may be used such as e.g., dental adhesives.

While many suitable embodiments have been disclosed in the foregoing description, applicants believe that the preferred center pin assembly comprises the embodiment of FIG. 3B, wherein center pin base 40, mandrel arbor 44, and retainer pin 48 comprise tool steel, and tip 42 comprises zirconia ceramic material, and mandrel arbor 44 has a square head 57, which engages with a counterbored hole 53 of ceramic tip 42.

It will be appreciated that the reworking of the ceramic tip, in the event of wear or damage, can be easily accomplished by pressing retainer pin 48 out of the assembly 34, replacing the worn ceramic tip 42 and reinstalling the mandrel arbor 44 and retainer pin 48. A similar reworking method may be employed for the first embodiment, where the interference fit between the base and the mandrel arbor 44 is released by heating the base, thereby allowing mandrel arbor 44 to be pulled from the base. Such a process is believed to be superior to the complete replacement or known stripping, re-plating, and regrinding operations presently used to rework worn metal center pins. Such a process is clearly superior from an environmental, health, and safety standpoint, as the practice of chrome plating requires the use of hexavalent chromium reagent.

Figure 5A:
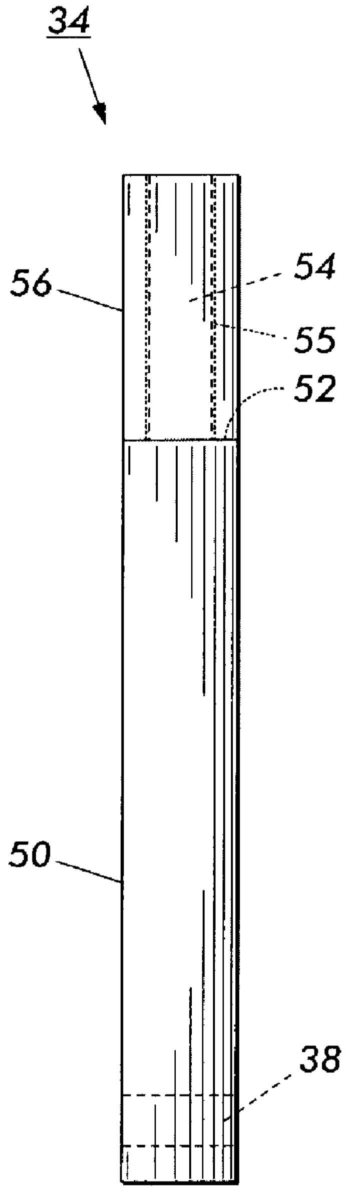
FIGS. 5A and 5B are cross-sectional views of two alternative embodiments of the present invention.
Figure 5B:
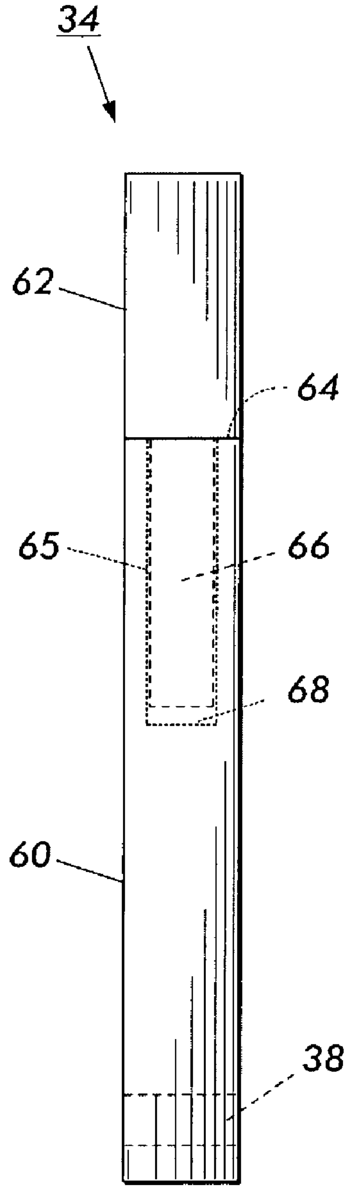

Referring next to FIGS. 5A and 5B, there are illustrated two alternative embodiments of the center pin 34. In the embodiment of FIG. 5A, the center pin 34 consists of only two components: base 50 and ceramic tip 56. Base 50 has a shoulder 52 and a shaft 54 extending outwardly beyond shoulder 52. Ceramic tip 56 is formed as a hollow sleeve or tube, with an outside diameter, and an inside diameter. The shaft 54 of base 50 is made to slidably fit within the inner diameter of ceramic tip 56. In this embodiment, the ceramic tip 56 may be affixed to shaft 54 by brazing the ceramic to the steel of the base 50 with a brazing compound. Brazing compound flows by capillary forces into the interstice 55 between the surfaces of shaft 54 and ceramic tip 56. For such purposes, it is believed that Ticusil (Ag 49.7%, Cu 47.2%, Ti 3.1%) or Cusil (Ag 55.4%, Cu 36.5%, Ti 8.1%) brazing compounds sold by Wesgo Metals of San Carlos, Calif. may prove suitable for such brazing of the ceramic tip 56 to the steel shaft 54 of base 50. A description of the art of brazing and the composition and properties of various brazing compounds is provided on pp. 2197–2204 of *Machinery's Handbook*, 22*nd Ed*., the disclosure of which is incorporated herein by reference.

In the alternative embodiment of FIG. 5B, the base 60 is formed as described with respect to base 40 of FIG. 3A. However, instead of employing an arbor to attach the ceramic tip, the ceramic tip 62 itself includes a shoulder 64 and a shaft 66 extending therefrom. The shaft 66 may be inserted into hole 68 of the center pin base 60 and brazed with brazing compound so as to retain the ceramic tip 62 therein. Brazing compound flows by capillary forces into the interstice 65 between the surfaces of shaft 66 and hole 68. Alternatively, instead of brazing, it may be possible to produce the shaft 66 and base 50 so as to provide an interference fit between these parts as described above.

In a further alternative embodiment, the shaft 66 may be produced with a slight negative taper—where the extreme end of the shaft 66 is larger in diameter than the end nearest shoulder 64, and the diameter of the entire shaft being of a diameter so as to be interference fit with the inside diameter of hollow 68. Then, in order to assemble the tip 62 to the base 60, the base is heated, preferably by induction heating, to expand the diameter of the hollow 68 sufficiently to allow the tapered shaft of the tip 62 to slide into the hollow. Once cooled to ambient temperature, the interference fit, or alternatively the taper of the shaft, would serve to hold the ceramic tip in semi-permanent attachment to the base. In this embodiment, it will be appreciated that reworking of a worn tip may be accomplished simply by heating the base 60 to remove the worn tip and inserting a new tip therein, thereby significantly reducing the steps and labor of rework.

Alternatively, an adhesive may be used to join ceramic tip 56 and base 50 of FIG. 5A, or ceramic tip 62 to base 60 of FIG. 5B. Such adhesives may be applied to the respective tip or base in the same manner as described for the embodiments of FIGS. 3A–3D, followed by the engagement of the tip with the base.

Figure 6A:
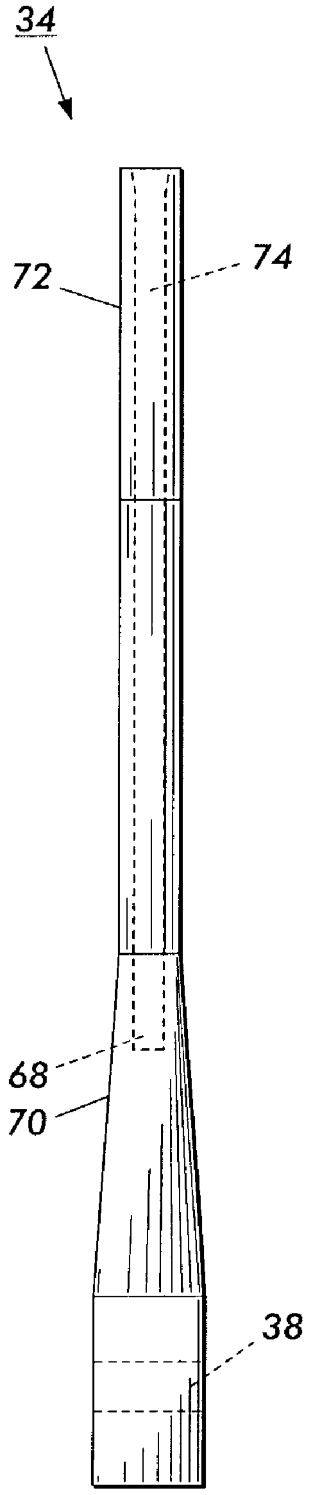
FIGS. 6A and 6B are cross-sectional views of the components and assemblies of an alternative center pin made in accordance with the present invention.
Figure 6B:
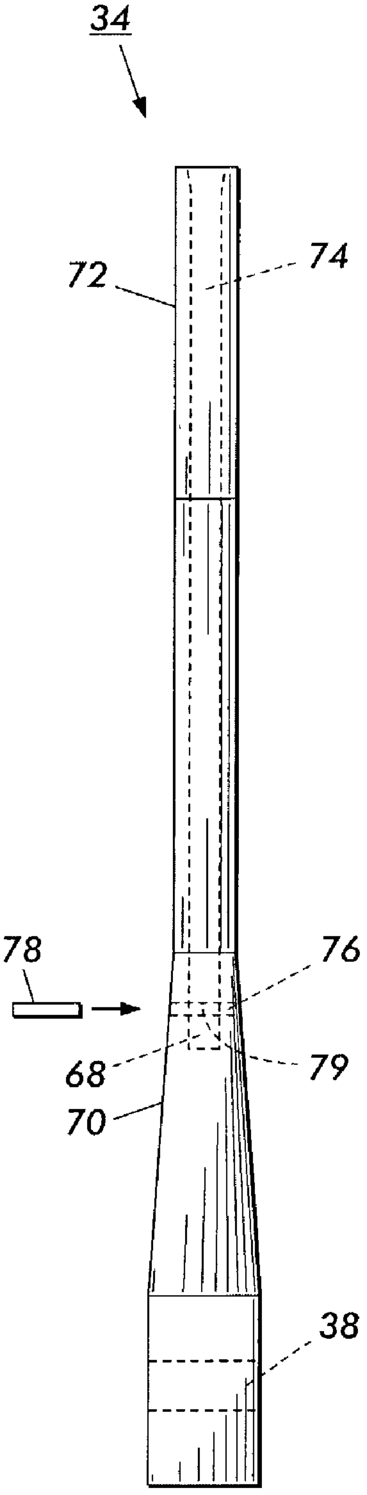

Attention is now turned to FIGS. 6A and 6B, where a smaller diameter center pin is depicted. The reduced diameter leads to additional considerations in the methods by which the center pin assembly 34 might be produced in order to provide the ceramic tips of the present invention. More specifically, center pin base 70, has a cylindrical hole 68 that extends into the center pin base for approximately 2.25 inches, but perhaps as far as aperture 38. Ceramic tip 72 forms the center pin tip so as to provide a wear resistant surface for the center pin assembly 34. Tip 72 is attached to the base using the mandrel arbor 74 as in the previously described embodiment shown in FIG. 3A, and an interference fit is used to retain the mandrel arbor 74 therein. Alternatively, in the embodiment depicted in FIG. 6B, a retainer pin 78 is inserted into hole 76 in the base 70 and hole 79 in mandrel arbor 74 to assemble the center pin assembly 34 as depicted in FIG. 6B. It is further contemplated, due to the reduced diameter of the top of center pin base 70, that the mandrel arbor 74 may be extended (and the cylindrical hollow 68 in the base 70 as well) so that the mandrel arbor 74 extends further into the base 70. Retainer pin hole 76 is correspondingly lower on the base 70, located in a region where the diameter of the base is somewhat larger than the minimum diameter at the tip, possibly near hole 38, where the diameter is at a maximum.

Alternatively or additionally, an adhesive may be used to join mandrel arbor 74 and base 70 of FIGS. 6A and 6B. Such adhesives may be applied to mandrel arbor 74 or base 70 in the same manner as described previously for the center pin assembly 34 of FIGS. 3A–3D, followed by the engagement of mandrel arbor 74 with base 70.

Figure 7A:
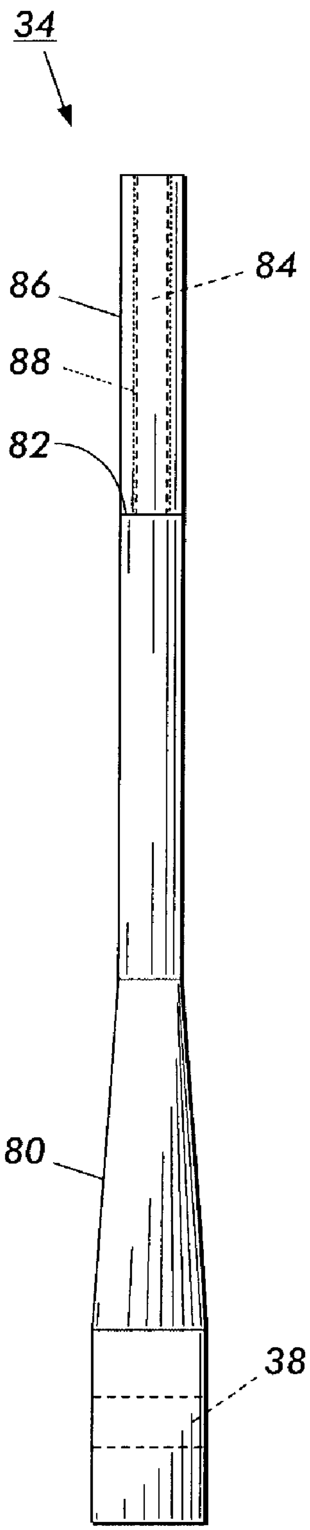
FIGS. 7A and 7B are cross-sectional views of two alternative embodiments of the present invention.
Figure 7B:
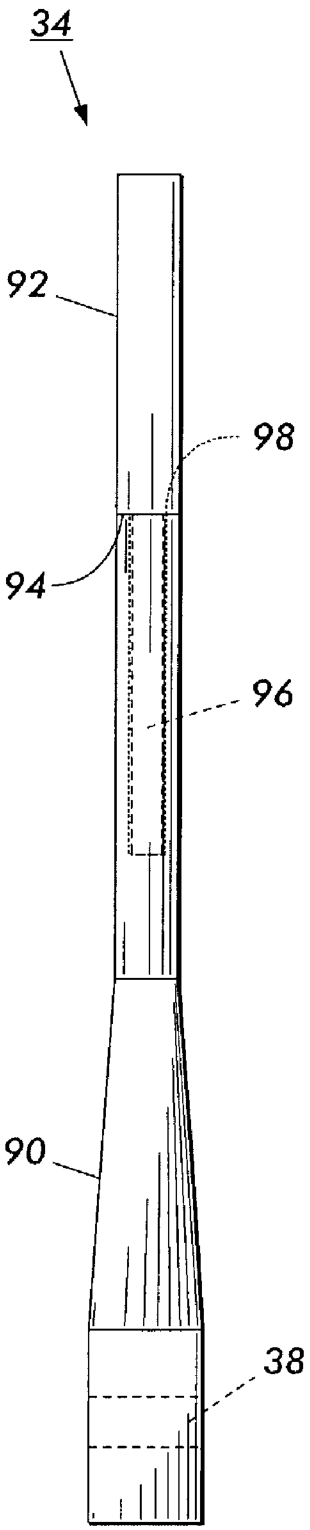

Referring finally to FIGS. 7A and 7B, there are illustrated two additional embodiments of the reduced diameter center pin assembly 34. In the embodiment shown in FIG. 7A, the center pin assembly 34 consists of only two components, a base 80 having a shoulder 82 and a shaft 84 extending outwardly beyond shoulder 82. The shaft 84 is made to slidably fit within the hole 88 of ceramic tip 86. In this embodiment, the ceramic tip 86 may be affixed to shaft 84 by brazing the ceramic to the steel of the base 80 (as shown in FIG. 5A). For such purposes, it is believed that Ticusil or Cusil (as previously described) may prove suitable for such brazing or soldering so as to bond the ceramic to the steel shaft. It is known that such brazing materials may be used in a sheet or paste form.

In the alternative embodiment shown in FIG. 7B, the base 90 is formed with a cylindrical hollow 98, and ceramic tip 92 includes a shoulder 94 and a shaft 96 extending therefrom. The shaft may be inserted into the hollow cylindrical region 98 and brazed so as to retain the ceramic tip therein (as shown in FIG. 5B). In a further alternative embodiment, the shaft 96 may be produced with a slight negative taper. Then, in order to assemble the tip 92 to the base 90, the base 90 is heated, preferably by induction heating means, to expand the inner diameter of hollow 98 sufficiently to allow the tapered shaft 96 of the tip 92 to slide into the hollow 98. Once cooled to ambient temperature, the taper of the shaft 96 would serve to hold the ceramic tip 92 in semi-permanent attachment to the base 90.

Alternatively or additionally, adhesives may be used to join shaft 84 and ceramic sleeve 86 of FIGS. 7A and 7B, in the same manner as recited previously for the center pin assembly 34 of FIGS. 3A–3D.

Alternatively or additionally, an adhesive may be used to join shaft 84 and ceramic sleeve 86 of FIGS. 7A and 7B. Such adhesives may be applied to the shaft 84 or ceramic sleeve 86 in the same manner as described previously for the center pin assembly 34 of FIGS. 3A–3D, followed by the engagement of shaft 84 with ceramic sleeve 86.

In all of the preceding embodiments of FIGS. 3A–7B, in which adhesive is used as to join a base and a tip together, there is formed an interstice (such as e.g. interstice 55 of FIG. 5A) between such parts, in which the adhesive (such as e.g. a liquid glue) flows and contacts the surface of such parts. Such an interstice is typically between 0.001 and 0.002 inches wide. In one embodiment, a fixture is used, which coaxially aligns such parts when the male part is inserted into the female part, and maintains such alignment until the adhesive is cured.

Figure 8:
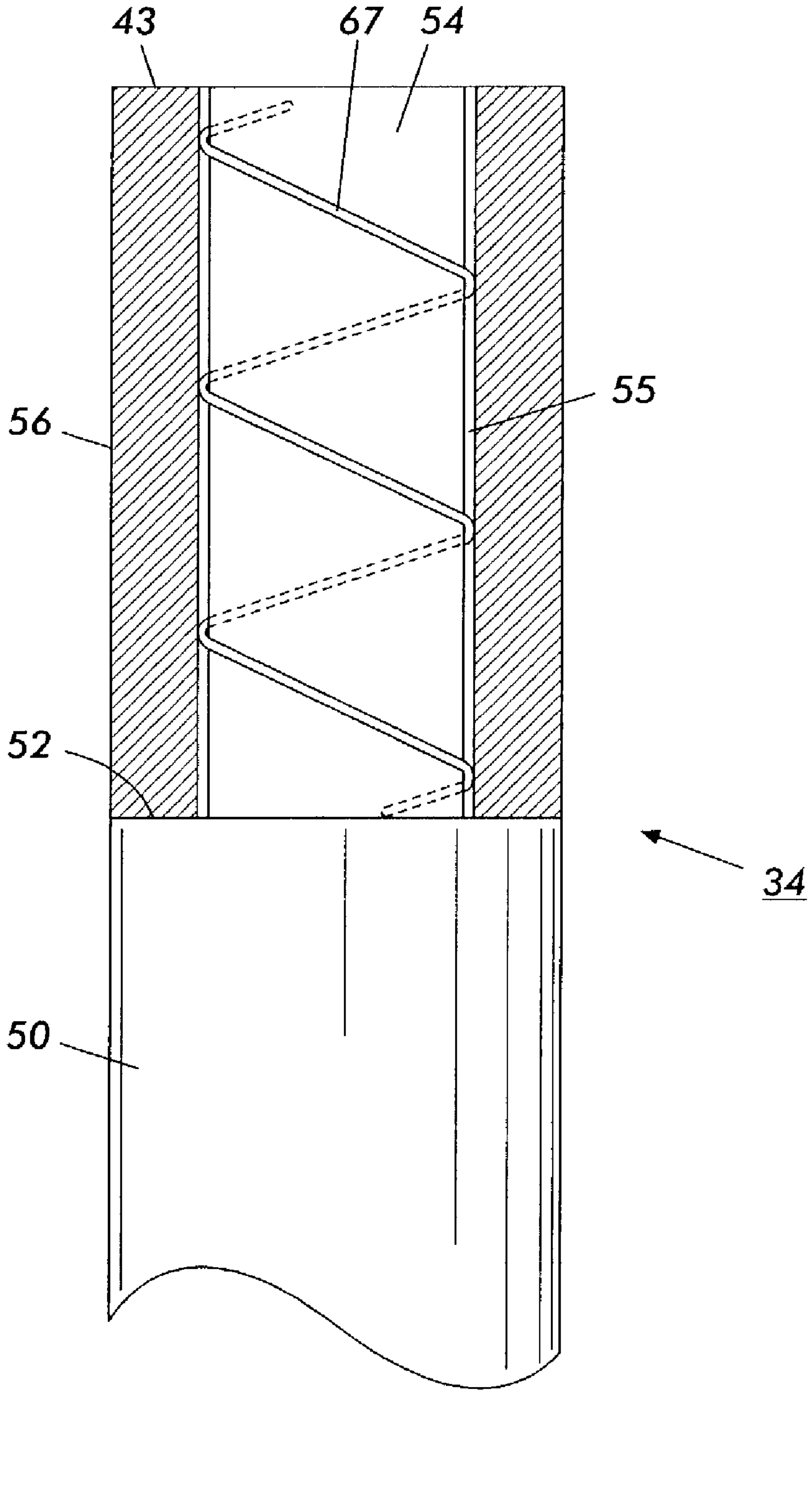
FIG. 8 is a detailed cross sectional view of an embodiment of the present invention wherein a ceramic tip is joined to a base using adhesive, and wherein a shimming wire is helically disposed on the male part thereof to effect the alignment of such part with the female part.

In another embodiment, a shimming wire is used to provide coaxial alignment of the parts of a center pin assembly. FIG. 8 is a detailed cross sectional view of an embodiment of the present invention wherein a ceramic tip is joined to a base using adhesive, and wherein a shimming wire is helically disposed on the male part thereof to effect the alignment of such part with the female part. Referring to FIG. 8, the upper end of the center pin assembly 34 of FIG. 5A is depicted, with ceramic tip 56 shown in cross-section. The front portion of ceramic tip 56 is thus removed, thereby exposing shaft 54 of base 50.

A shimming wire 67 is helically disposed around shaft 54, beginning near shoulder 52 of base 50, and ending near the top 43 of ceramic tip 56. Shimming wire 67 is of a uniform diameter along its length, equal to the width of interstice 55 between shaft 54 and ceramic tip 56. Thus, shimming wire 67 serves the purpose of maintaining shaft 54 and ceramic tip 56 in coaxial alignment when shaft 54 and ceramic tip 56 are assembled.

When shaft 54 and ceramic tip 56 are joined together with an adhesive, such adhesive occupies interstice 55, and shimming wire 67 maintains the coaxial alignment of shaft 54 and ceramic tip 56 while such adhesive cures. Suitable adhesives may be the same as those described for the embodiments of FIGS. 3A–3D.

Shimming wire 67 is preferably disposed around shaft 54 for at least three full 360 degree turns, along at least half of the length of shaft 54. In one embodiment, interstice 55 has an average width of 0.005 inches; shimming wire has a diameter of 0.005 inches.

In the preceding embodiment, shaft 54 is considered to be the male part of center pin assembly, and ceramic tip 56 is considered to be the female part. It is to be understood that the preceding description is also applicable to the center pin assemblies of FIGS. 3A, 5B, 6A, 6B, 7A, and 7B, wherein the shimming wire is helically disposed around the equivalent male (shaft) part. It is also to be understood that a narrow ribbon of shim stock having a rectangular cross section and a uniform thickness could be substituted for the shimming wire of the preceding embodiments, wherein such shim stock ribbon is helically disposed about the male part of the center pin assembly, thereby achieving substantially the same result.

In a further alternative embodiment, mandrel arbor 44 (FIG. 3A) or shaft 66 (FIG. 5B), or various other mating surfaces as described herein, may include a threaded portion to engage with a threaded mating portion of the base. For example, referring to FIG. 3A, a lower portion 51 of mandrel arbor 44 may include threads that are screwed into threaded interior region within the base 40. It is further contemplated that the exposed (top) end of mandrel arbor 44 may then have a slot, hex key or similar mechanism (not shown) to tighten mandrel arbor 44 within the base. Moreover, the use of a retaining pin or similar mechanism may be employed to lock the threaded shaft within the base.

Figure 9:
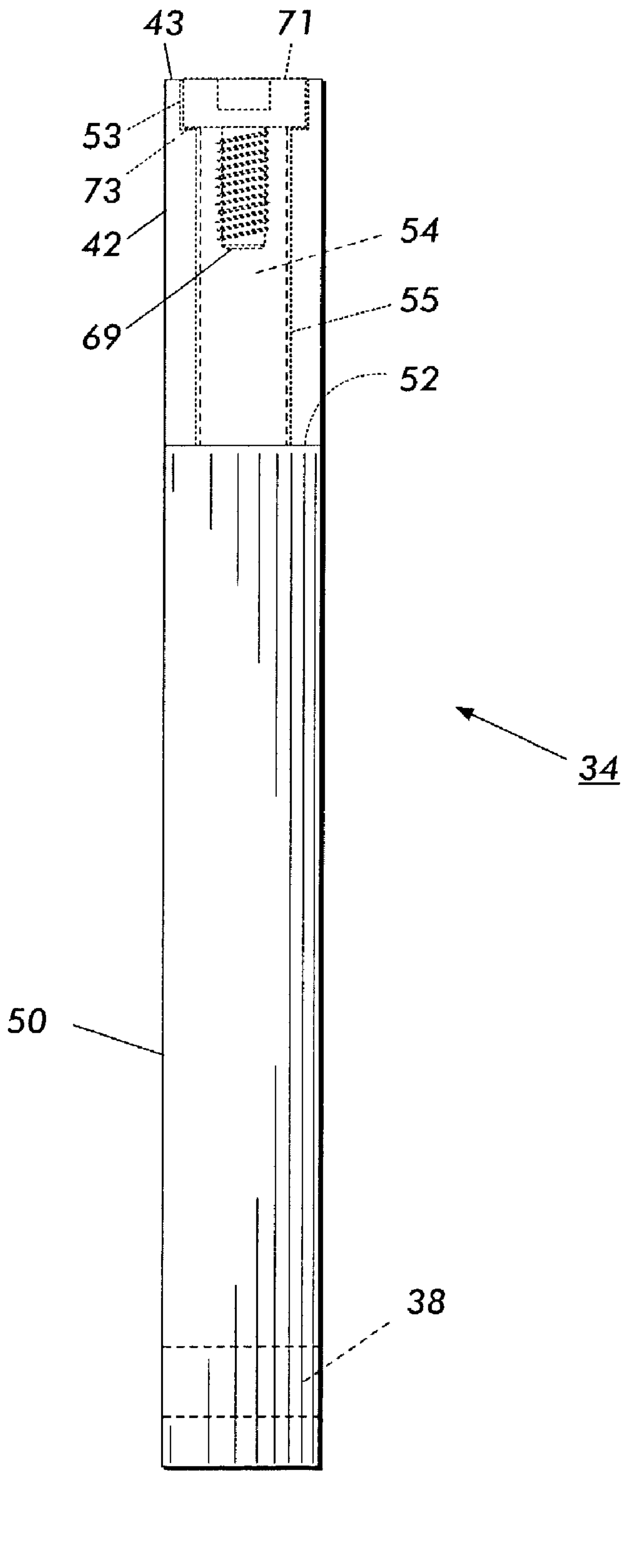
FIG. 9 is a cross sectional view of an additional embodiment of the present invention, in which a threaded fastener is used to join the parts thereof.

In another embodiment, the center pin assembly of the present invention, which comprises a ceramic tip and a base, is joined together with a threaded fastener. FIG. 9 is a cross sectional view of such an embodiment, in which a threaded fastener is used to join the ceramic tip to the base. Referring to FIG. 9, base 50 of ceramic pin assembly 34 is similar to base 50 of FIG. 5A, but further comprises a threaded hole 69 tapped in the end thereof. Ceramic tip 56 is similar to ceramic tip 42 of FIG. 3B, comprising a counterbore 53 disposed in the end 43 thereof. A threaded fastener 71 having a square shoulder 73 (such as, e.g. a socket head cap screw) is engaged with threaded hole 69 such that square shoulder 73 bears upon the base of counterbore 53 of ceramic tip 42, thereby securing ceramic tip 42 to base 50.

In one embodiment, threaded fastener 71 is bonded into tapped hole 69 by a thread locking sealant such as e.g. a cyanoacrylate adhesive. In another embodiment, threaded fastener 71 is a self locking setscrew, provided with a plastic (e.g. nylon) insert along its threaded length, which is deformed when threaded fastener 71 is engaged with tapped hole 69. Such self-locking screws are well known in the art. In another embodiment, threaded fastener 71 is a self locking screw, having a coating of microencapsulated beads of reactive resin and hardener, such that when threaded fastener 71 is threadedly engaged with tapped hole 69, the shearing action of threads of threaded fastener 71 with threads of tapped hole 69 rupture and mix the contents of the microencapsulated beads, thereby making an adhesive composition (e.g. an epoxy), which locks threaded fastener 71 into tapped hole 69. Such reactive adhesive coatings for the securing of threaded fasteners are well known in the art.

In the preferred embodiment of FIG. 9, the inner diameter of ceramic tip 42 and the diameter of shaft 54 are preferably chosen such that the width of interstice 55 is substantially zero, and ceramic tip 42 requires only a hand press fit to be assembled onto shaft 54. Thus, by providing a center pin assembly comprising a threaded fastener and ceramic tip that are easily removed by hand, the ceramic tip may be changed while the entire center pin assembly 34 remains installed in the compaction tool. Such a feature is advantageous, because it enables a simple and rapid changeover of ceramic tips, thereby minimizing the cost of downtime of the compaction process of battery manufacturing.

Although described relative to the tooling employed for the compaction of battery components, the present invention is intended to include, within its scope, the use of similar techniques to extend the life of other compaction tools and punches, including, but not limited to tablet compaction, powder metal compaction etc. For example, the techniques described with respect to FIGS. 5A and 5B, and FIGS. 7A and 7B may be employed to produce ceramic tips for various compaction punches (upper and lower, etc.) wherein the tips may be manufactured from longer-wearing ceramic components and fitted to the metal punch base.

In recapitulation, the present invention is a method and apparatus for the production of compacted powder elements. More specifically, the present invention is directed to the improvement of tooling for powder compaction equipment, and the processes for making such tooling. The improvement comprises the use of a ceramic tip or similar component in high wear areas of the tooling. Moreover, the use of such ceramic components enables reworking and replacement of the worn tool components.

It is, therefore, apparent that there has been provided, in accordance with the present invention, a method and apparatus for improving the performance of compaction tooling. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. An apparatus for forming a powder material into a battery component through the application of pressure, comprising:

a die;

a lower compression punch insertable into a lower end of said die;

a center pin with a rigid metal base and a ceramic-tip, said center pin being inserted within the die to provide a form for a hollow region in the battery component, said center pin remaining stationary relative to the die during compaction of the battery component therearound;

powder material for filling at least a portion of the cavity defined by said die, said lower compression punch and said center pin; and an upper compression punch, insertable into an upper end of said die to compact the powder material against the lower compression punch, wherein the shape of the outer periphery of the battery component is defined by the die and the shape of a hollow region in the solid form is defined by the center pin, and where the ceramic-tip reduces the wear of an outer surface of said center pin as the battery component is removed from the cavity by the lower compression punch pushing the battery component free of the die and center pin.

2. The apparatus as recited in claim 1, wherein the center pin comprises a base of steel, and a tip of a ceramic material.

3. The apparatus as recited in claim 2, wherein said rigid material of said base of said center pin is pre-hardened steel.

4. The apparatus as recited in claim 2, wherein said ceramic material of said center pin tip is zirconia ceramic material.

5. The apparatus as recited in claim 2, wherein said center pin further comprises a mandrel arbor disposed within and positively engaged with said ceramic-tip of said center pin.

6. The apparatus as recited in claim 5, wherein said mandrel arbor is fastened to said base by an interference fit between said mandrel arbor and a hole disposed within said base.

7. The apparatus as recited in claim 6, wherein said interference fit is a shrinkage fit.

8. The apparatus as recited in claim 5, wherein said mandrel arbor is fastened to said base by a retainer pin inserted in coaxially aligned holes i n said base and said mandrel arbor.

9. The apparatus as recited in claim 5, wherein said mandrel arbor is fastened to said base by an adhesive.

10. The apparatus as recited in claim 5, wherein said mandrel arbor further comprises a square head engaged in a counterbore disposed in the end of said tip.

11. The apparatus as recited in claim 2, wherein said base further comprises a shoulder, and a shaft outwardly extending from said shoulder; and said tip comprises a hollow sleeve having an inside diameter; and wherein said shaft of said base is slidably fitted within said inside diameter of said tip.

12. The apparatus as recited in claim 11, wherein said tip is affixed to said shaft of said base by brazing.

13. The apparatus as recited in claim 11, wherein said tip is affixed to said shaft of said base by an interference fit.

14. The apparatus as recited in claim 11, wherein said tip is affixed to said shaft of said base by an adhesive.

15. The apparatus as recited in claim 2, wherein said tip further comprises a shoulder, and a shaft outwardly extending from said shoulder; and said base has a hole extending therein having an inside diameter; and wherein said shaft of said tip is slid ably fitted within said inside diameter of said hole.

16. The apparatus as recited in claim 15, wherein said shaft of said tip is affixed to said base by brazing.

17. The apparatus as recited in claim 15, wherein said shaft of said tip is affixed to said base by an interference fit.

18. The apparatus as recited in claim 15, wherein said shaft of said tip is affixed to said base by an adhesive.

19. An apparatus for forming a powder material into a battery component through the application of pressure, comprising:

a die;

a lower compression punch insertable into a lower end of said die;

a ceramic-tipped center pin, comprising a base formed of a conductive material, and a tip of a ceramic material, said center pin being inserted within the die to provide a form for a hollow region in the battery component, said center pin remaining stationary relative to the die during compaction of the battery component therearound, where the ceramic material reduces the wear of at least a portion of an outer periphery of said center pin;

powder material for filling at least a portion of the cavity defined by said die, said lower compression punch and said center pin; and an upper compression punch, insertable into an upper end of said die to compact the powder material against the lower compression punch, wherein the shape of the outer periphery of the battery component is defined by the die and the shape of a hollow region in the battery component is defined by the center pin, and where the ceramic-tip reduces the wear of an outer surface of said center pin as the battery component is removed from the cavity by the lower compression punch pushing the battery component free of the die and center pin.

20. The apparatus as recited in claim 1, wherein said battery component is cylindrically shaped.

21. The apparatus as recited in claim 5, wherein said mandrel arbor further comprises a tapered head engaged in a counterbore disposed in the end of said tip.

22. The apparatus as recited in claim 2, wherein said ceramic material of said center pin tip is alumina.

23. The apparatus as recited in claim 2, wherein said ceramic material of said center pin tip is a mixture of zirconia and alumina.

24. The apparatus as recited in claim 2, wherein said ceramic material of said center pin tip is selected from the group consisting of: silicon carbide; tungsten carbide; titanium nitride; and carborundum.

25. The apparatus as recited in claim 19, wherein said center pin further comprises a mandrel arbor disposed within and positively engaged with said ceramic-tip of said center pin.

26. The apparatus as recited in claim 25, wherein said mandrel arbor further comprises a head engaged in a counterbore disposed in the end of said ceramic tip.

* * * * *